F. J. COOK.
ELECTRICALLY HEATED OVEN.
APPLICATION FILED AUG. 31, 1909.

988,695.

Patented Apr. 4, 1911.

WITNESSES:

INVENTOR
Frank James Cook
BY
ATTORNEYS

UNITED STATES PATENT OFFICE.

FRANK JAMES COOK, OF COLLINWOOD, OHIO.

ELECTRICALLY-HEATED OVEN.

988,695.

Specification of Letters Patent. Patented Apr. 4, 1911.

Application filed August 31, 1909. Serial No. 515,442.

*To all whom it may concern:*

Be it known that I, FRANK J. COOK, a citizen of the United States, and a resident of Collinwood, in the county of Cuyahoga and State of Ohio, have invented a new and Improved Electrically-Heated Oven, of which the following is a full, clear, and exact description.

My invention relates to electrically-heated ovens, my more particular purpose being to provide a construction comprising one or more heat radiating slabs made of stone and especially adapted for receiving and holding the heating wire.

My construction is of special service relative to ovens used for baking, warming, and enameling; also in connection with pancake griddles, broilers, toasters, chafing-dishes, and hot plates. The heat radiating slab which I use and which is operated electrically, is suitable for general cooking and for use in fireless cookers, hot water heaters, and coffee percolators, as well as for heating rooms, and is employed in various other relations.

Reference is to be had to the accompanying drawings forming a part of this specification, in which similar characters of reference indicate corresponding parts in all the figures.

Figure 1:
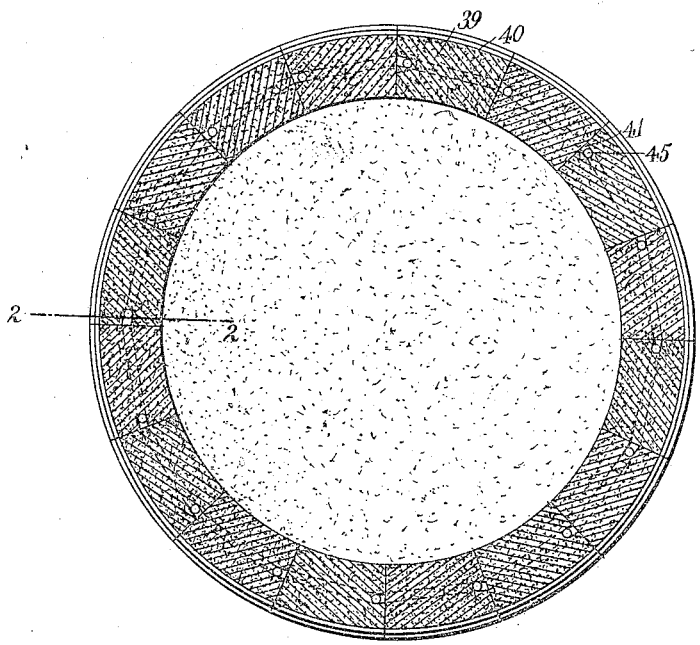
Figure 2:
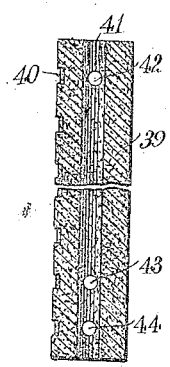

Figure 1 is a cross section of my improved form of oven, which comprises a number of staves having generally the form of sectors and built into substantially cylindrical shape. Fig. 2 is a section on the line 8—8 of Fig. 1, looking in the direction of the arrow, and showing the arrangement of the channels and poles for accommodating the heating wire.

A number of staves 39 made of stone have each a segmental form, the several staves being held together by hoops 40 and provided with channels 41. Each stave is further provided with holes 42, 43, 44, these holes together with the channels 41 being adapted to accommodate the heating wire 45, which is bent sinuously back and forth relatively to the various staves. The heating wire is thus disposed between the inner and outer walls or surfaces of the receptacle. Each stave is provided upon one only of its edges with one of the channels 41, the holes 42, 43, 44 merging into this channel, as will be understood from Fig. 2.

Among the various advantages presented by my invention are the following: I. I employ a direct application of heat to the stone or to the heat retaining element. II. Heat is forced to pass directly through the stone owing to the fact that one side of the stone is fitted against heat-resisting material, so that heat can escape only in the direction opposite such material. III. The life of the heating wire is greatly prolonged, owing to the fact that the heat from the wire is absorbed quite readily by the stone. IV. The amount of current required to operate this device is quite small in proportion to the heating results. V. The construction is quite cheap and simple.

While for convenience I show this form for my oven, I do not limit myself to the precise construction disclosed. Neither do I limit myself to the use of any particular materials except as specified in the claim.

Having thus described my invention, I claim as new and desire to secure by Letters Patent:

The combination of a number of staves each made of stone and provided upon one of its edges only with a channel, each stave being further provided with holes merging into said channel, and a heating wire threaded back and forth through the several channels and extending through said holes from one channel to another.

In testimony whereof I have signed my name to this specification in the presence of two subscribing witnesses.

FRANK JAMES COOK.

Witnesses:
  G. S. REBMAR,
  A. J. GRISWOLD.